(12) United States Patent
Ozeri

(10) Patent No.: US 12,029,991 B2
(45) Date of Patent: Jul. 9, 2024

(54) PLAYGROUND INTERACTIVE GAMING SYSTEM

(71) Applicant: PARK PLAYER LTD, Ashdod (IL)

(72) Inventor: Dror Ozeri, Ashdod (IL)

(73) Assignee: Park Player Ltd., Ashdod (IL)

( * ) Notice: Subject to any disclaimer, the term of this patent is extended or adjusted under 35 U.S.C. 154(b) by 283 days.

(21) Appl. No.: 17/608,566

(22) PCT Filed: May 5, 2020

(86) PCT No.: PCT/IL2020/050494
§ 371 (c)(1),
(2) Date: Nov. 3, 2021

(87) PCT Pub. No.: WO2020/225812
PCT Pub. Date: Nov. 12, 2020

(65) Prior Publication Data
US 2022/0226742 A1  Jul. 21, 2022

(30) Foreign Application Priority Data

May 8, 2019 (IL) .......................................... 266541

(51) Int. Cl.
| | |
|---|---|
| *A63G 31/06* | (2006.01) |
| *A63B 24/00* | (2006.01) |
| *A63B 71/06* | (2006.01) |
| *A63G 33/00* | (2006.01) |
| *A63F 13/211* | (2014.01) |

(52) U.S. Cl.
CPC .......... *A63G 31/06* (2013.01); *A63B 24/0087* (2013.01); *A63B 71/0622* (2013.01); *A63G 33/00* (2013.01); *A63B 2024/0093* (2013.01); *A63B 2024/0096* (2013.01); *A63B 2071/0638* (2013.01); *A63B 2208/12* (2013.01); *A63B 2220/56* (2013.01); *A63B 2220/807* (2013.01); *A63B 2220/833* (2013.01); *A63B 2225/50* (2013.01); *A63B 2225/685* (2013.01); *A63B 2230/015* (2013.01); *A63B 2230/06* (2013.01)

(58) Field of Classification Search
CPC ............ G06F 3/01; G06F 13/31; G06F 13/50; G06T 13/40; G06T 19/00; G06T 19/006; A63F 13/30; A63F 13/40; A63F 13/211
USPC ............................................. 472/116, 59, 60
See application file for complete search history.

(56) References Cited

U.S. PATENT DOCUMENTS

| | | |
|---|---|---|
| 5,785,630 A | 7/1998 | Bobick et al. |
| 10,384,745 B1 * | 8/2019 | Vallabh ................. B62B 15/006 |

(Continued)

FOREIGN PATENT DOCUMENTS

CN        107 510 917 A        12/2017

OTHER PUBLICATIONS

Communication and Supplementary European Search Report for EP 20 80 2001; mailed Apr. 19, 2023 (9 pages).

(Continued)

*Primary Examiner* — Kien T Nguyen
(74) *Attorney, Agent, or Firm* — Roach. Brown McCarthy & Gruber, P.C.; Kevin D. McCarthy

(57) ABSTRACT

The present invention relates to a playground interactive gaming system which integrates physical playground play with interactive computerized gaming, thus attracting children of all ages to enjoy healthy outdoor physical activity while playing a single-player or multi-player video game.

20 Claims, 2 Drawing Sheets

(56) References Cited

U.S. PATENT DOCUMENTS

| | | |
|---|---|---|
| 2010/0035726 A1 | 2/2010 | Fisher et al. |
| 2014/0349752 A1 | 11/2014 | Nadel et al. |
| 2015/0151182 A1 | 6/2015 | Ellis et al. |
| 2016/0202754 A1 | 7/2016 | Aleksiev et al. |
| 2016/0253911 A1 | 9/2016 | Jespersen et al. |

OTHER PUBLICATIONS

International search report for PCT/IL2020/050494, mailed on Jun. 17, 2020 (4 pages).
Written Opinion of the international searching authority for PCT/IL2020/050494, mailed on Jun. 17, 2020 (5 pages).
International preliminary report on patentability for PCT/IL2020/050494, mailed around Sep. 19, 2021 (11 pages).

* cited by examiner

PLAYGROUND INTERACTIVE GAMING SYSTEM

FIELD OF THE INVENTION

The present invention is in the field of playground equipment. More particularly, the invention relates to a playground interactive gaming system.

BACKGROUND OF THE INVENTION

Since the early years of personal computing, multiplying interactive games are introduced to computer users. The introduction and development of game consoles, mobile devices and applications therefor (e.g., smartphones and tablets) have even a greater impact. With the later playing amusement arenas rapidly expanding, the once popular neighborhood playgrounds, providing multi-sensual physical activities, have lost popularity in favor of indoor interactive local and network gaming, The different computerized games introduce new challenges and new skills, which many times correspond to desirable skills which are required for the operation of modern appliances and technical devices (i.e., operating different game controllers, thus practicing the operation of controllable appliances). In many aspects computer games can encourage cognitive skills (e.g., simulated board games, quests, educational and strategy games), motor and fine-motor skills (e.g., using control devices such as joysticks or games in which the players has to perform actual physical gestures which are captured by computer cameras, pressure sensing devices etc.), and social skills (e.g., competitive and team-play multi-player network gaming).

Still, there is a wide agreement regarding the importance of advantageous outdoor activities in the aspects of exposure to fresh air, sunlight, multi-sensual stimulating environment and face-to-face interactions.

Hence joining the popular interactive computerized gaming with playground apparatus would be highly advantageous for attracting young children, youth and even adults to return to the previously preferred playgrounds and practice physical activity in the opens, while enjoying modern interactive gaming.

Any equipment installed in the outdoor and particularly in a public area is prone to operational deterioration due to environmental conditions (e.g., dust, humidity, moisture, sunlight etc.), heavy-duty rough usage and infrequent preventive maintenance. Therefore, installing computerized equipment in outdoor playgrounds could be operationally challenging. Furthermore, local computerized gaming systems installed at a public playground may require significant maintenance resources (i.e., for software proliferation, maintenance and upgrades) and would be potentially exposed to hacking and to virus contamination.

It is an object of the present invention to provide an interactive playground gaming system, which integrates the abovementioned advantages of computerized interactive gaming with the advantageous physical activity in the opens.

It is another object of the present invention to provide a centralized gaming system which is easy to maintain, and which is durable under heavy-duty usage conditions.

It is yet another object of the present invention to provide a gaming system which is intuitive and simple to operate.

Other objects and advantages of the invention will become apparent as the description proceeds.

SUMMARY OF THE INVENTION

A playground interactive gaming system, comprising:
a playground apparatus comprising one or more user-operated electro-mechanical elements, at least one sensor which can detect the user's operations of said electro-mechanical elements, and communication means adapted to communicate with a remote server, wherein said playground apparatus has a unique identification; and
a mobile device equipped with an application adapted to associate said mobile device with a said playground apparatus via said remote server using the unique identification of said playground apparatus, thereby enabling an interaction between said mobile device and one or more user-operated electro-mechanical elements.

According to an embodiment of the invention, the remote server is running a game application and said user's operations on said electro-mechanical elements of said playground apparatus affect the performance of a corresponding avatar within said game, wherein display and/or sound of the game are presented by said mobile device, e.g., via a web user interface, a designated application's user interface and the like.

According to an embodiment of the invention, the electro-mechanical elements comprise a controller with pressing and shifting elements, a mechanical actuator, essentially tubular structural elements.

According to an embodiment of the invention, the playground apparatus comprising a supporting arrangement (e.g., a docking base) suitable for the placement of the mobile device.

According to an embodiment of the invention, the at least one sensor is selected from the group consisting of pressure sensors, gyroscopes, potentiometer and photosensitive sensors.

According to an embodiment of the invention, at least one of the mobile device's embedded sensors is utilized for detecting the user's activity while interacting with the playground apparatus.

According to an embodiment of the invention, user's information is communicated to the server and may affect the game complexity and physical challenging levels. For example, the user's information may include weight, heart rate (pulse), age, etc., or any combination thereof.

According to an embodiment of the invention, the supporting arrangement (e.g., the docking base) comprises a magnetic coupling element allowing coupling to mobile devices equipped with a corresponding rear magnetic element.

According to an embodiment of the invention, the system further comprises mechanical feedback means utilized to simulate various game conditions, experienced by said avatar in the virtual game reality, to the user which plays the playground apparatus.

According to an embodiment of the invention, the mechanical feedback means comprises a mechanical device which controls the operational difficulty of the electro-mechanical elements.

According to an embodiment of the invention, the mechanical feedback means comprises a vibrations generator which simulates various game conditions such as obstacles.

According to an embodiment of the invention, the power supplies circuitry to the electricity consuming elements is supplied through a connection to the local utility network.

According to an embodiment of the invention, the power supplies circuitry to the electricity consuming elements is supplied by at least one rechargeable battery.

According to an embodiment of the invention, the playground gaming apparatus comprises an electric generator coupled with at least one pedal actuator, wherein the rotation of the at least one pedal actuator by a user (i.e., a player) is utilized for charging said at least one rechargeable battery.

According to an embodiment of the invention, the power supplies circuitry to the electricity consuming elements is supplied by a combination of a connection to the local utility network and at least one rechargeable battery.

According to an embodiment of the invention, the playground apparatus is designed similarly to a pedal-operated device (e.g., such as bicycles), comprising adapted pedals mechanical actuator and handlebar controller.

According to an embodiment of the invention, the playground apparatus is designed as a spring supported apparatus or a playground spring rider.

According to an embodiment of the invention, the server is configured to handle multiple users using mobile devices which are associated with corresponding units of gaming apparatus, thereby allowing a multiplayer network gaming, wherein each individual gaming apparatus has a unique identification

DETAILED DESCRIPTION OF THE DRAWINGS

The present invention relates to a playground interactive gaming system which integrates physical playground play with interactive computerized gaming, thus attracting children of all ages to enjoy healthy outdoor physical activity while playing a single-player or multi-player video game.

The gaming system of the present invention is comprised of at least one playground gaming apparatus having a unique identification and at least one mobile device, wherein the playground apparatus comprises electro-mechanical elements which are physically operated by a playground user, and communication means (e.g., LAN/WAN communication device) adapted for bi-directional communication with a remote server, and wherein the mobile device is running a suitable application for receiving the unique identification of the playground gaming apparatus (e.g., NFC tag, barcode plate, QR code symbol) and communicating it to the remote server. The association of the mobile device with the playground gaming apparatus by the remote server, enables an interaction between the playground apparatus and the mobile device, in a manner that operations performed by a user on the playground gaming apparatus are received by the remote server and expressed in a video and/or sound presented in a desirable user interface which is displayed through an internet browser, or a designated application running on the mobile device.

Reference will now be made to several embodiments of the present invention, examples of which are illustrated in the accompanying figures for purposes of illustration only. Moreover, the following discussion is intended to provide a brief, general description of a suitable computing environment adapted to be implemented in the invented gaming system. One skilled in the art will readily recognize from the following description that alternative embodiments of the comprising elements herein may be employed without departing from the principles of claimed invention.

Figure 1:
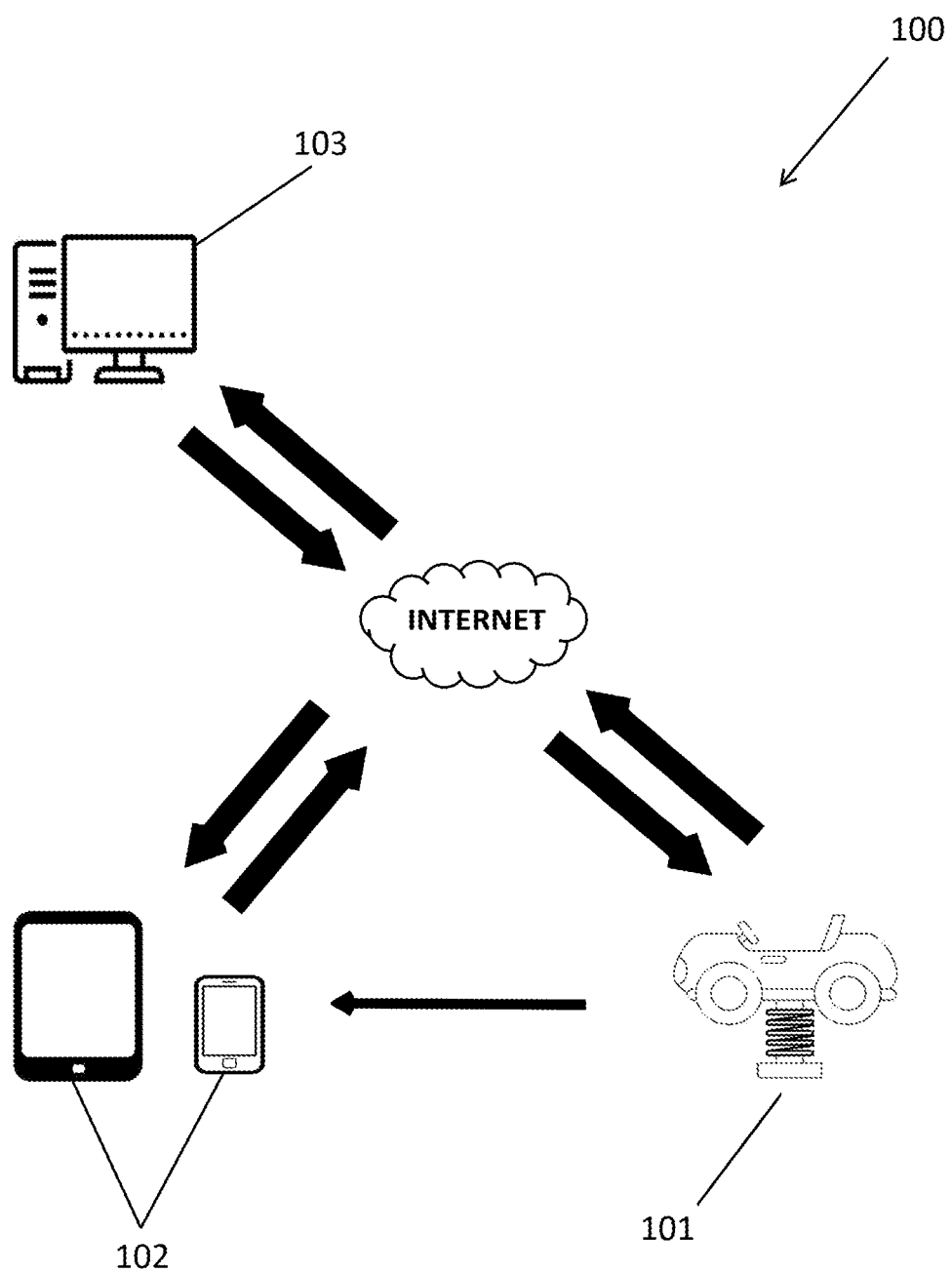
FIG. 1 schematically illustrates a schematic diagram of the invented gaming system with one connected user, according to an embodiment of the present invention.

FIG. 1 schematically illustrates a schematic diagram a gaming system 100, according to an embodiment of the present invention, in which gaming system 100 is comprised of gaming apparatus 101, a mobile device 102 (e.g., a smartphone or a tablet), and a remote server 103, wherein an application running on mobile device 102 receives the unique identification of gaming apparatus 101, communicates it to server 103 which associates mobile device 102 with gaming apparatus 101.

According to an embodiment of the present invention, server 103 runs a game application in which electro-mechanical operations performed by a user which plays with gaming apparatus 101, are communicated to server 103 and being translated to operations of a corresponding avatar representing the user and gaming apparatus 101 in the virtual game reality. For example, where gaming apparatus 101 is designed as a rocking car with a steering wheel, the turning of the steering wheel by the user is translated to the turning of a corresponding car's avatar within a racing game running on sever 103. Of course, while FIG. 1 illustrates a single gaming apparatus 101, server 103 can handle multiple users using mobile devices which are associated with corresponding units of gaming apparatus 101, allowing a multiplayer network gaming, such as remotely located users are simultaneously operating multiple units of gaming apparatus 101 and competing at the same virtual race.

Figure 2:
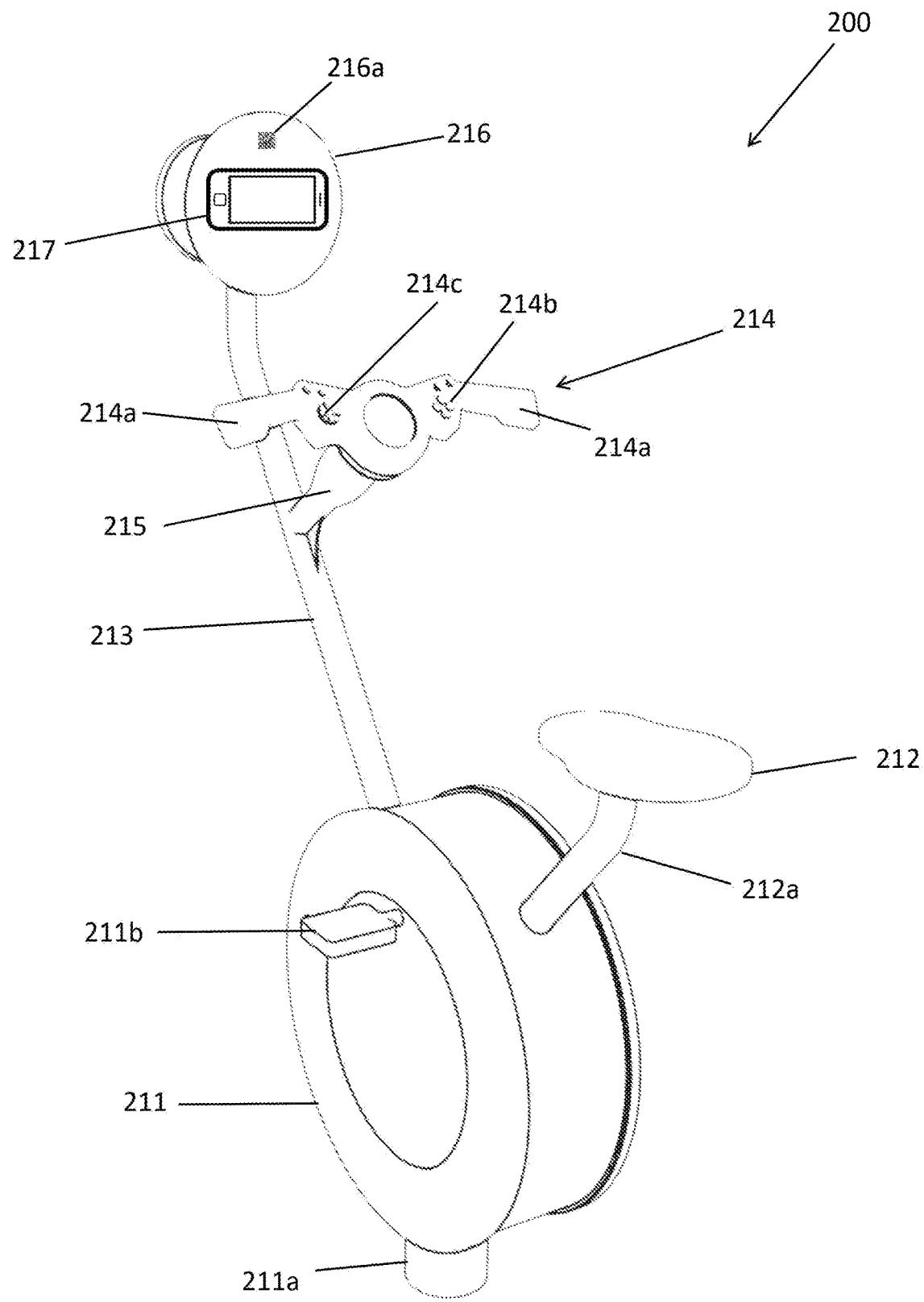
FIG. 2 schematically illustrates an advanced playground gaming apparatus, according to an embodiment of the present invention.

FIG. 2 schematically illustrates a playground apparatus 200, according to an embodiment of the present invention, in which apparatus 200 is designed similarly to a pedal-operated device (e.g., bicycle-like device) comprising main body structural and electro-mechanical elements such as an enclosure 211, a tubular stand 211a, a pedal actuator 211b, a seat 212 supported by a tubular seat post 212a, and a tubular support lead 213. Additionally, apparatus 200 comprises a controller 214 (e.g., which can be designed similarly to a bicycle handlebar) with a tubular base 215 which allows the rotation of controller 214 (e.g., an internal bearing), a docking base 216 adapted to physically support a smartphone 217 (e.g., docking base 216 may comprise a magnetic coupling element for attaching smartphone 217), and a unique ID element 216a for enabling to uniquely identify apparatus 200, in order to associate smartphone 217 with this specific playground apparatus 200. For example, unique ID element 216a can be a QR code in form of a label or any other suitable form of a machine-readable optical label that contains information about apparatus 200, that can be physically attached to any suitable location on the body of apparatus 200. In this embodiment, ID element 216a can be read by a suitable application running on smartphone 217 and communicated to a remote server 103, which associate smartphone 217 with this specific playground apparatus 200.

According to an embodiment of the present invention, server 103 is running a game application, which simulates a bicycles racing, in which the user of gaming apparatus 200 is represented as an avatar riding on bicycles and racing other avatars (i.e., of other users in the same or in different playgrounds, wherein the user's actual operation of gaming apparatus 200 (e.g., pedaling and/or leaning forward/rearward/aside) and of controller 214 (e.g. rotation, grip strength of handles 214a, pressed buttons 214b or tilted joystick 214c) are communicated to server 103 and translated to in game actions of said user's or users' avatar. According to an embodiment of the present invention the virtual game reality and performance of participating avatars (i.e., users' or computer avatars) are displayed within a web user interface which can be accessed users authorized by server 103 (i.e., following an association of each user's mobile device with a corresponding identified gaming apparatus 200. According to other embodiments, the user interface is presented on a designated client application of the game, which is running on smartphone 217.

The user's electro-mechanical operations of gaming apparatus 200 are detected by sensors such as a pressure sensor, pedal speed sensor (e.g., cog wheel with photo sensor identifying a colored or missing tooth), a gyroscope sensor (i.e. sensing the tilting direction and extent of gaming apparatus 200) are transmitted to server 103 and affect the performance of the user's avatar in the game. The various sensors can be distributed within any of the comprising elements of gaming apparatus 200.

According to an embodiment of the present invention, further user's information such as weight (e.g., detected by a pressure sensor or entered by the user), pulse (e.g., located in controller's grip handles 214a) and age (i.e., entered by the user in the web/application user interface), is utilized to affect the game complexity and physical challenging.

According to an embodiment of the present invention, gaming apparatus 200 comprises a controller mediator unit, comprising a processing unit and a short range communication unit, wherein said mediator unit can interface with an external game controller such as common game console controller, in lieu or together with controller 214, thus enabling the player to use his own controller.

According to an embodiment of the present invention, gaming apparatus 200 further comprises feedback elements, providing a mechanical and/or voice feedback (e.g., mechanical vibrations generator, operational effects generators such as a clamping clutch device for changing the rotation difficulty of pedal actuator 211b, sound device for in game or operational alerts etc.), which are utilized to enhance the gaming experience. For example, climbing a hill in-game would increase the pedal rotation difficulty and running into an obstacle would result with a suitable vibration feedback.

According to an embodiment of the present invention, the power to the electricity consuming elements of gaming apparatus 200 (e.g., controller 214, and feedback elements) is supplied through a connection to the local utility network. According to other embodiments, gaming apparatus 200 comprises a rechargeable battery, which is charged by local maintenance personnel, or by an electric power generator which is driven by actuator 211b when operated by the player. Different embodiments of the present invention may further use a combination of the abovementioned power supply means.

According to an embodiment of the present invention, the electric and controls wirings are channeled entirely within the various tubular elements of gaming apparatus 200.

According to some embodiments of the present invention, gaming apparatus 200 is a spring supported device or a playground spring rider toy that for example can be shaped as an animal or as an airplane with a suitable design of the main body structural and electro-mechanical elements (e.g., a tilting rod for which simulates an airplane's control stick). A skilled person in the art will realize the plurality of possible game applications and corresponding designs of gaming apparatus 200 which would provide attractive physical activities with an amusing interactive computerized gaming, without stepping away from the embodiments of FIGS. 1 and 2.

Alongside the abovementioned advantages of a centralized game server, the utilization of server 103 enables a plurality of operational applications such as remotely monitoring the proper functioning of the distributed playground apparatuses, usage statistics, and global playgrounds contests.

Although embodiments of the invention have been described by way of illustration, it will be understood that the invention may be carried out with many variations, modifications, and adaptations, without exceeding the scope of the claims.

The invention claimed is:

1. A playground interactive gaming system, comprising:
   a) a playground apparatus comprising one or more user-operated electro-mechanical elements, at least one sensor adapted to detect user's operations of said electro-mechanical elements, and communication means adapted to communicate with a remote server, wherein said playground apparatus has a unique identification; and
   b) a mobile device equipped with an application adapted to link said mobile device with said playground apparatus via said remote server using the unique identification of said playground apparatus, thereby enabling an interaction between said mobile device and one or more user-operated electro-mechanical elements.

2. The system of claim 1, in which the remote server is running a game application and the user's operations on the electro-mechanical elements of the playground apparatus affect the performance of a corresponding avatar within the game application, wherein the game display and sound are presented by said mobile device.

3. The system of claim 2, in which the display and sound are presented by said mobile device through a web user interface.

4. The system of claim 2, in which the display and sound are presented by said mobile device through a designated application's user interface.

5. The system of claim 2, further comprising mechanical feedback means utilized to simulate various game conditions, experienced by said avatar in a virtual game reality, to the user which uses the playground apparatus.

6. The system of claim 5, in which the mechanical feedback means comprises a mechanical device which controls the operational difficulty of the electro-mechanical elements.

7. The system of claim 5, in which the mechanical feedback means comprises a vibrations generator which simulates various game conditions.

8. The system of claim 1, in which the electro-mechanical elements comprise a controller with pressing and shifting elements, a mechanical actuator, and essentially tubular structural elements.

9. The system of claim 1, in which the at least one sensor is selected from the group of pressure sensors, gyroscopes, potentiometers and photosensitive sensors.

10. The system of claim 1, in which the application further adapted to utilize at least one of the mobile device's embedded sensors for detecting the user's interaction with the electro-mechanical elements of the playground apparatus.

11. The system of claim 1, in which user's information is communicated to the server and affects the game complexity and physical challenging levels.

12. The system of claim 11, in which the user's information is selected from the group consisting of: weight, heart rate (pulse), age or any combination thereof.

13. The system of claim 1, in which the power supplies circuitry to the electricity consuming elements is supplied through a connection to the local utility network.

14. The system of claim 1, in which the power supplies circuitry to the electricity consuming elements is supplied by at least one rechargeable battery.

15. The system of claim 14, in which the playground apparatus comprises an electric generator coupled with at least one pedal actuator, wherein the rotation of the at least one pedal actuator is utilized for charging said at least one rechargeable battery.

16. The system of claim 1, in which the power supplies circuitry to the electricity consuming elements is supplied by a combination of a connection to the local utility network and at least one rechargeable battery.

17. The system of claim 1, in which the playground apparatus is designed similarly to a pedal-operated device, comprising adapted pedals mechanical actuator and handlebar controller.

18. The system of claim 1, in which the playground apparatus is designed as a spring supported apparatus or a playground spring rider.

19. The system of claim 1, in which the server is configured to handle multiple users using mobile devices which are associated with corresponding units of playground apparatus, thereby allowing a multiplayer network gaming, wherein each individual playground apparatus has a unique identification.

20. The system of claim 1, in which the playground apparatus comprising a supporting arrangement suitable for the placement of the mobile device.

* * * * *